Oct. 20, 1970  H. J. SCHWERDHOFER  3,534,627
SPEED CHANGING MECHANISM FOR A BICYCLE
Filed Oct. 8, 1968  2 Sheets-Sheet 1
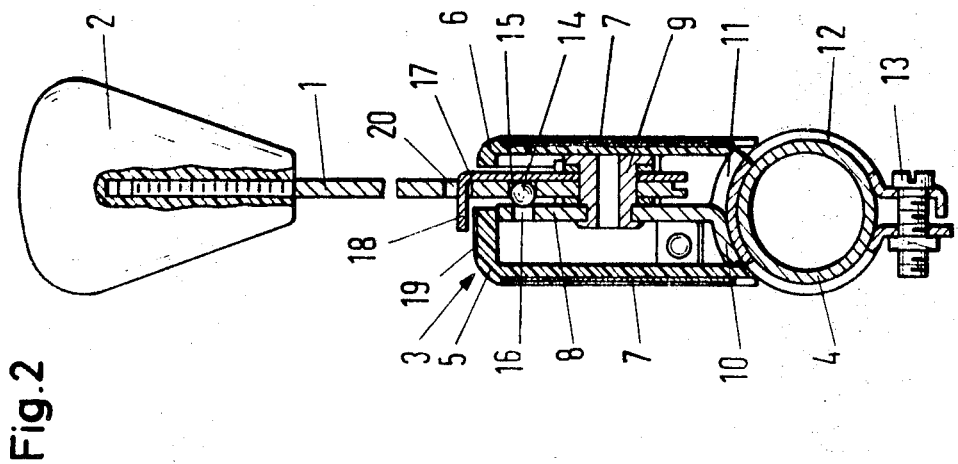
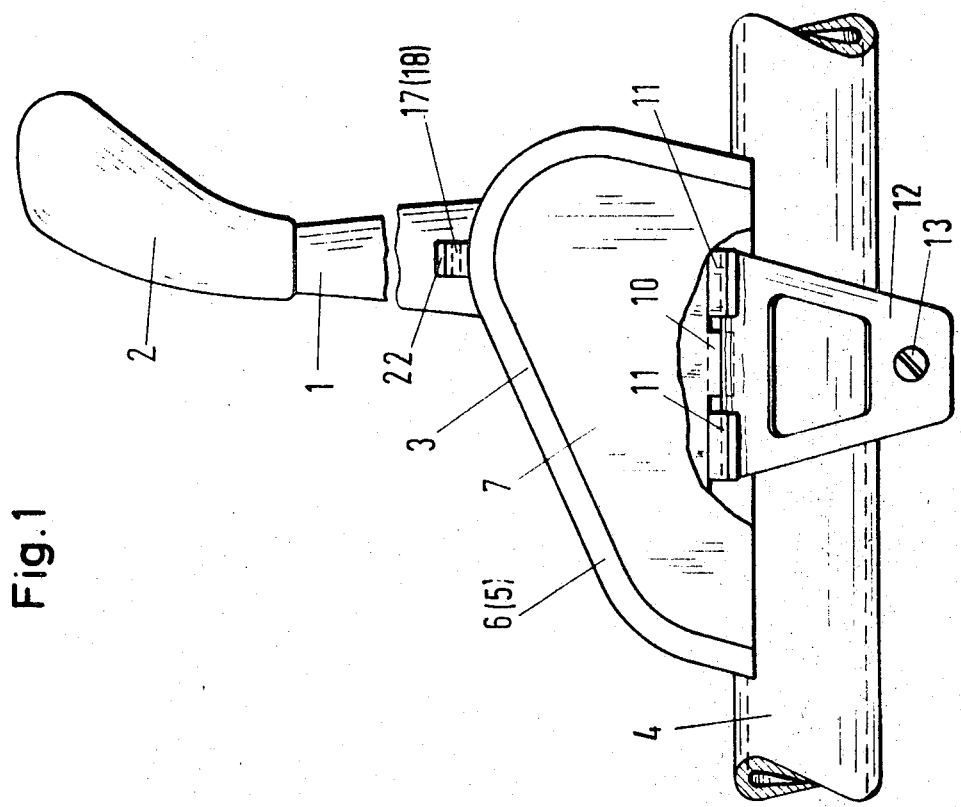
INVENTOR
Hans Joachim Schwerdhöfer Oct. 20, 1970  H. J. SCHWERDHOFER  3,534,627
SPEED CHANGING MECHANISM FOR A BICYCLE
Filed Oct. 8, 1968  2 Sheets-Sheet 2

INVENTOR.
Hans Joachim Schwerdhöfer
By: Low and Berman
AGENTS

United States Patent Office 3,534,627
Patented Oct. 20, 1970

3,534,627
SPEED CHANGING MECHANISM
FOR A BICYCLE
Hans Joachim Schwerdhofer, Schweinfurt, Germany, assignor to Fichtel & Sachs A.G., Schweinfurt, Germany
Filed Oct. 8, 1968, Ser. No. 765,770
Claims priority, application Germany, Oct. 14, 1967,
F 33,007
Int. Cl. G05g 9/00
U.S. Cl. 74—473                                    4 Claims

ABSTRACT OF THE DISCLOSURE

The frame-mounted speed-changing lever of a bicycle having a multiple-speed transmission is pivotally fastened to a support plate clamped to the top tube of a bicycle frame by a clip in a position in which the plate extends upward in the vertical plane of symmetry of the clip and of the frame, thereby keeping the speed-changing mechanism away from the rider's knees. The click-stop of the lever is held engaged by a leaf spring whose end projects from the housing of the mechanism and partly at right angles through the lever as an indicator of the set speed cooperating with indicia on the housing.

BACKGROUND OF THE INVENTION

This invention relates to a speed-changing mechanism for the multiple-speed transmission of a bicycle or like vehicle having a tubular frame.

The speed-changing mechanisms mounted on the handlebars of a boy's bicycle or like vehicle recently have been replaced in part by lever mechanisms mounted on the top tube of the vehicle frame and intended to simulate to some extent the floor-mounted gear shifting lever of a sports car. The known mechanisms of this type are arranged laterally of the top tube or cross bar of the bicycle frame between the head and saddle tubes. While this arrangement satisfies the esthetic sense of a young rider, it interferes with the free movement of his knees, and such speed-changing mechanisms therefore have not found favor among adults.

Yet, a speed-changing mechanism which does not encumber the handle bars and is not so close to the brake levers as to invite errors, particularly in an emergency, has real advantages, and it is an object of the invention to provide a mechanism which is free from the shortcomings of known devices.

SUMMARY OF THE INVENTION

The speed-changing mechanism of the invention is fastened to the bicycle frame by a clip as in conventional, but the plate-shaped support member which carries the operating lever and other elements of the mechanism is attached to the clip in a position in which the support fastened to the bicycle frame by a clip as is conventional, member extends mainly in a plane which substantially bisects the clip. This arrangement permits the clip to be clamped in an arc or a closed loop to a member of the tubular bicycle frame in such a manner that the support member and the operating lever are confined between two planes which are parallel to each other, tangential to the arc or loop of the clip, and parallel to the afore-mentioned plane which bisects the clip. Relatives to the attached tubular frame member, the support member and the operating lever are located in or closely adjacent a plane through the axis of the frame member. When the last-mentioned plane coincides with the plane of symmetry of the bicycle frame, the support member and the operating lever stand straight up from the top bar of the frame, and clear the knee room.

Other features, additional objects and many of the attendant advantages of this invention will readily be appreciated as the same becomes better understood by reference to the following description of a preferred embodiment when considered in connection with the appended drawing.

BRIEF DESCRIPTION OF THE DRAWING

In the drawing:

FIG. 1 shows a speed-changing mechanism of the invention mounted on the partly illustrated frame of a man's bicycle in side-elevational view, a portion of the housing being broken away to reveal internal structure;

FIG. 2 shows the apparatus of FIG. 1 in front elevational section corresponding to that of FIG. 4;

DESCRIPTION OF THE PREFERRED EMBODIMENT

Figure 3:
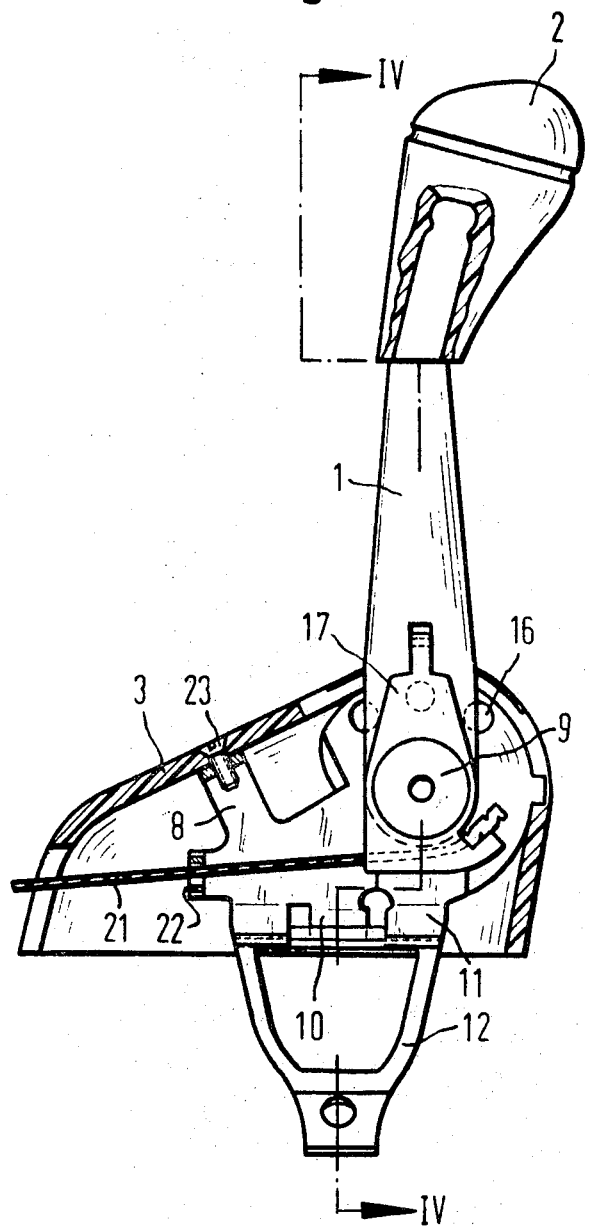
FIG. 3 shows the speed-changing mechanism of FIG. 1 released from the bicycle frame in side elevation without a portion of its housing.

The operating lever of the illustrated speed-changing mechanism is a flat, normally upright metal bar 1 carrying a knob 2 at its top end which projects from a housing 3 fastened to the top bar 4 of a man's bicycle frame, not otherwise shown, or to the down tube (not shown) of a woman's bicycle.

The housing 3 consists of two plastic shell parts 5, 6 which are cemented to each other so as to leave a slot therebetween for movably guiding the lever 1. The shell parts 5, 6 carry decorative metal facings 7.

The housing 3 is attached by screws 23 to a metal plate 8 which supports and connects all elements of the mechanism. The lever 1 is fastened to the plate 8 by a pivot pin 9 which is a hollow shoulder rivet. Its axis is horizontal in the illustrated upright position of the plate 8. The bottom edge portion of the plate 8 is divided by vertical slots into three lugs of equal size. The two outer lugs 11 are bent out of the plane of the plate 8 in one direction, the center lug 10 in the opposite direction.

Figure 4:
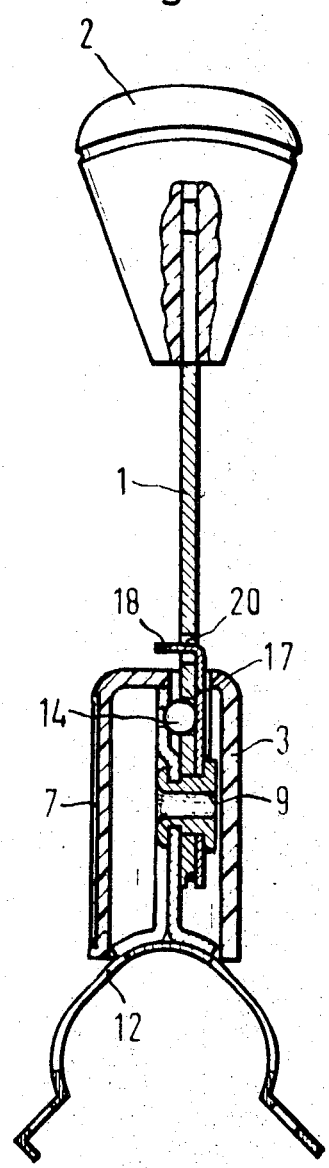
FIG. 4 illustrates the mechanism in section on the line IV—IV in FIG. 3.

The lugs 10, 11 tangentially straddle the bight portion of a resilient clip 12 which is approximately U-shaped in the open, relaxed condition seen in FIG. 4, and envelopes the top bar or tube 4 in an arc of 360° or a closed loop when tightened by a clamping screw 13 connecting the free ends of the U-shape. The clip 12 is spot-welded to the lugs 10, 11.

The lever 1 is yieldably held in three positions corresponding to the three transmission ratios of an associated, non-illustrated transmission in the rear wheel hub of the bicycle by a click stop device including a steel ball 14 partly received in a bore 15 of the lever 1 within the housing 3, and moves past three bores 16 in the plate 8 when the lever 1 pivots on the pin 9.

One end of the bore 15 is covered by a leaf spring 17 whose one end is loosely mounted on the pin 9 between the lever 1 and the head of the pin. The narrower other end of the spring 17 extends radially along one side of the lever 1 and out of the housing 3, and then at right angles through a passage 20 in the lever. The free end portion 18 of the spring 17 which projects from the other side of the lever 1 and is parallel to the pivot axis cooperates with index marks 19 molded into the top face of the plastic housing 3 to indicate the angular position of the lever 1, the spring 17 being coupled to the lever by engagement therewith in the passage 20.

Movement of the lever 1 is transmitted to the non-illustrated hub transmission by a Bowden cable 21 (FIG. 3) attached to the short arm of the lever 1 in the housing 3 and guided in part in a lug 22 projecting at right angles from the main portion of the plate 8 within the housing 3.

Except for the knob 2, the speed-changing mechanism is so slim and mounted in such a manner that it does not project laterally beyond the bicycle frame farther than the clip 12 in the closed position of the latter. As is clearly seen in FIGS. 2 and 4, the entire mechanism, except the knob 2, is confined well within a space defined between upright parallel planes tangential to the arc or loop of the clip 12, and approximately equidistant from and parallel to the main portion of the plate 8. When properly installed on a man's bicycle, as shown in FIG. 2, the speed-changing mechanism does not occupy space needed for free knee movement, the knob 2 being well above knee level.

When mounted on the frame of a woman's bicycle in an obvious analogous manner, not illustrated, the speed-changing mechanism offers the same advantage.

The mechanism is rugged enough because of its simple construction to withstand normal use over the useful lifetime of the associated transmission. The specific illustrated click stop arrangement whose spring also serves as an index mark, and is assembled with the lever 1 in a very simple manner materially contributes to the relatively low cost of construction for the unit.

Those skilled in the art will readily adapt the illustrated mechanism to bicycles and similar vehicles having tubular frames other than that partly illustrated in the drawing, and modify the clip and supporting plate accordingly. The use of a laterally enlarged clip or of two clips attached to suitably extended lugs similar to the lugs 10, 11 is specifically contemplated for bicycles having two top tubes arranged side by side.

What is claimed is:

1. In a mechanism for changing the transmission ratio of a multiple speed transmission in a bicycle or like vehicle having a tubular frame, the mechanism including a plate shaped support member, an operating lever pivotally fastened to said support member, motion transmitting means connected to said lever for changing said transmission ratio in response to the pivotal movement of said lever on said support member, arcuate clip means on said support member and adapted to be fastened to said frame, the improvement which comprises: attaching means attaching said support member to said clip means in a position in which the support member extends mainly in a plane substantially bisecting said clip means and substantially tangential to the arc of said clip means, said attaching means including a lug integral with said support member and angularly offset from said bisecting plane, said lug being fixedly fastened to said clip means.

2. In a mechanism as set forth in claim 1, clamping means for clamping said clip means to a member of said tubular frame in an arc, said support member and said lever being confined between two imaginary planes parallel to each other and substantially parallel to said bisecting plane, said two planes being each tangential to said arc.

3. In a mechanism as set forth in claim 2, a housing mounted on said support member, said housing enveloping said support member and a portion of said lever, the free end portion of said lever projecting from said housing, a pivot pin connecting said lever to said support member, a click stop member movably mounted on a portion of said lever spaced from said pivot pin, a plurality of recesses in said support member respectively alignable with said click stop member by said pivotal movement of the lever, a spring member mounted on said pivot pin for movement with said lever and engaging said locking member for biasing the same into engagement with an aligned recess, a portion of said spring member remote from said pivot pin extending outward of said housing for movement relative thereto when said lever pivots on said support member, and index means on said housing alignable with said remote portion of the spring member for indicating the angular position of said lever.

4. In a mechanism as set forth in claim 3, said pivot pin having an axis, said free end portion of the lever being formed with an axial passage therethrough, said spring member extending from said pivot pin along one side of said lever and through said passage, said remote portion of said spring member projecting from said passage on the other side of lever.

References Cited

UNITED STATES PATENTS

| 2,824,463 | 2/1958 | Gleasman et al. | 74—489 |
| 3,442,148 | 5/1969 | Juy | 74—489 X |

MILTON KAUFMAN, Primary Examiner

U.S. Cl. X.R.

74—489, 535